United States Patent [19]

Dickerson

[11] 4,222,790

[45] Sep. 16, 1980

[54] CALCINATION OF FERRITE TANS

[75] Inventor: Theodore Dickerson, Monroe, La.

[73] Assignee: Cities Service Company, Tulsa, Okla.

[21] Appl. No.: 23,479

[22] Filed: Mar. 23, 1979

[51] Int. Cl.² ............................................. C09C 1/24
[52] U.S. Cl. .................................................. 106/304
[58] Field of Search ................... 106/304; 252/62.59; 423/632, 633, 594

[56] References Cited

U.S. PATENT DOCUMENTS

| | | | |
|---|---|---|---|
| 2,502,130 | 3/1950 | Downs et al. | 423/430 |
| 2,558,302 | 6/1951 | Marcot et al. | 106/304 |
| 2,904,395 | 9/1959 | Downs | 423/594 |
| 2,980,617 | 4/1961 | Ireland | 252/62.5 |
| 3,832,455 | 8/1974 | Smith et al. | 106/304 |
| 3,847,502 | 3/1976 | Leitner et al. | 423/632 |
| 4,136,158 | 1/1979 | Okada et al. | 423/632 |

*Primary Examiner*—O. R. Vertiz
*Assistant Examiner*—Mark Bell
*Attorney, Agent, or Firm*—George L. Rushton

[57] ABSTRACT

An alkali metal silicate solution is added to a slurried mixture of yellow iron oxide monohydrate and zinc oxide (or magnesium oxide). After thorough mixing, and the mixture is filtered, dried, and calcined, giving a ferrite tan pigment.

6 Claims, No Drawings

CALCINATION OF FERRITE TANS

BACKGROUND OF THE INVENTION

This invention relates to the production of pigmentary ferrites; more particularly, it relates to an improvement in the calcination step in the production of these ferrites. Pigmentary ferrites are a new class of iron oxide pigments, in which iron oxide is reacted with other metallic oxides to form a series of chemical compounds known as ferrites. For example, zinc ferrite theoretically contains 33.7% zinc oxide, but in practice from about 32% to about 34%, with the remainder being ferric oxide. Magnesium ferrite contains about 20% magnesium oxide. These ferrites, which have a tan color, have a typical formula designated as $M(FeO_2)_2$, $MO.Fe_2O_3$, or $MFe_2O_4$. These ferrites are commercially useful as pigments. Other ferrites are useful for magnetic applications.

Except for red iron oxide pigments, other iron oxide pigments, such as those having yellow, brown, or black colors, are subject to color changes when heated above about 200° C. and are subject, therefore, to certain limitations in use. On the other hand, the tan oxides, known as "ferrite tans" or "tans", have the property of retaining their colors when the materials are heated to temperatures in excess of 200° C.

A typical procedure in the preparation of tan oxide includes the steps of mixing a synthetic ferric oxide (or ferric oxide hydrate) with a metal oxide, such as zinc oxide or magnesium oxide, and calcining the intimate mixture. Calcination temperatures of about 925°–980° C. (1700°–1800° F.) are needed to react the metal oxide and the iron oxide to form the compound known as ferrite. It is during this calcination step that problems arise. When using a rotary calciner, material cakes on the walls, leading to inefficient heat transfer and "overburning" of the material. Hammers or vibrators are needed to remove the caked material from the calciner walls, and these broken pieces of hard material are difficult to mill to give a proper particle size. When a screw conveyor calciner is used, material cakes on the screw flights and becomes hard and "overburned". The build-up of this caked material may be such that the screws jam, or a piece of the hard, caked material can break off, jamming the screws. A build-up of cake is noted by an increase of torque in the screw drive mechanism. Jams may occur several times during an eight hour working shift. When the screw conveyors jam, the screw flights are exposed to the high heat of the calciner, leading to damaged screws. Furthermore, the smaller pieces of caked material that may pass through the screw conveyors are hard and are thus difficult to mill to the proper particle size.

SUMMARY OF THE INVENTION

My invention overcomes, in large part, the disadvantages and problems found during the calcination of prior art ferrite materials. My method for improving the calcination of ferrite tans comprises, in serial steps, (a) mixing an aqueous slurry of yellow iron oxide monohydrate with an aqueous slurry of a metal oxide selected from the group consisting of zinc oxide and magnesium oxide, (b) adding, to the above mixture of slurries, an aqueous solution of an alkali metal silicate selected from the group consisting of sodium silicate and potassium silicate, (c) mixing the materials of step (b), (d) filtering and drying the mixture of step (c), and (e) calcining the mixture of step (d).

DESCRIPTION OF THE PREFERRED EMBODIMENTS

The preparation of pigmentary tan oxides, or pigmentary ferrites, is well known. U.S. Pat. No. 2,502,130, issued to Downs and Martin, discloses the preparation of magnesium ferrite pigment. U.S. Pat. No. 2,904,395, issued to Downs and Martin, discloses the production of zinc ferrite pigment. Both of these patents are incorporated by reference.

One of the preferred raw materials for preparing tan oxides is pigmentary alpha ferric oxide hydrate, or yellow oxide of iron. This yellow oxide can be prepared in various ways, a preferred one being that disclosed in U.S. Pat. No. 2,939,767, issued to Martin. This patent is also incorporated by reference.

Magnetic ferrites can be prepared by adding other metal oxides, such as barium oxide, to ferric oxide and calcining the mixture. At times, "doping" amounts of additional metals are added to improve the magnetic properties. The addition of alkali metal silicates to the mixtures used in the preparation of magnetic ferrites improves the operation of the calcining step.

The major ingredients in the preparation of a tan oxide are pigmentary alpha ferric oxide hydrate (yellow oxide of iron) and a metal oxide, exemplified by MgO or ZnO. In a typical procedure a "yellow slurry", a slurry of yellow oxide of iron, and a "white slurry", a slurry of the metal oxide, are mixed, filtered, dried, and calcined to give the ultimate metal ferrite, $MFe_2O_4$.

A yellow slurry is prepared, such as by the procedure used in U.S. Pat. No. 2,939,767 or by slurrying previously-prepared pigmentary alpha ferric oxide hydrate. The slurry is prepared by any typical method known in the art, such as by adding the oxide particles to water, with proper agitation. The concentration of the slurry is not critical, in that it can vary from a "thin" slurry to a "thick" slurry, such as from 10 wt.% to about 25 wt.% of iron oxide in water. Similarly, the "white slurry" is prepared by a typical procedure, such as mixing the metal oxide powder with sufficient water to form a proper concentration of slurry. Here again, the concentration can vary from about 10 wt.% to 25 wt.%. It is important in preparing ferrites that stoichiometric amounts of the yellow iron oxide and the metal oxide are used. It is understood that iron oxide is a metal oxide, but I prefer to differentiate between the oxides of iron and the other metal oxides that are used to prepare the ferrites; thus, "metal oxide" in this specification refers to the oxides that are added to the iron oxide in the preparation of a tan ferrite.

After the two slurries, of the proper stoichiometric relationship, are well mixed, to assure intimate commingling, an aqueous solution of an alkali metal silicate is added, the alkali metal silicate being selected from the group consisting of sodium silicate and potassium silicate. A satisfactory silicate solution is "Sodium Silicate-N Grade", produced by Philadelphia Quartz Co., containing about 28 wt.% $SiO_2$.

The amount of silicate added is sufficient to form from about 0.2 wt.% to about 1.0 wt.% $SiO_2$, based on the dry weight of the final ferrite product. An amount of silicate equivalent to about 0.4–0.6 wt.% $SiO_2$ is preferred.

As an alternative to the alkali metal silicate solution added to the slurries that are the precursors of the ferrite, a slurry of precipitated or fumed silica can be used. The amount of silica used, as a slurry, is such as to give from about 0.2 to about 1.0 wt.% $SiO_2$, based on the final ferrite product. An aqueous slurry of about 2–10 wt.% $SiO_2$ can be added to the iron oxide—metal oxide slurry mixture. A suitable silica is Cab-O-Sil M-5, produced by Cabot Corp.

The mixture of oxide slurries and silicate solution, at ambient temperature, is stirred, such as by sparged air. After the silicate solution has been added to and mixed with the combination of the white and yellow slurries, it is desirable to allow the total mixture to be stirred for an additional time, such as from about 5 to about 15 minutes. At times, following the addition of the silicate solution, the iron oxide and metal oxide particles appear to be somewhat dispersed, compared to their status prior to the addition of the silicate. This is noted by an apparent lowering of viscosity of the stirred mixture. To reverse this dispersion and to initiate flocculation (to aid in filtration), alum can be added to the liquid mixture. Although the term "alum" is used for several different compounds in the chemical industry, I am using "alum" to refer to aluminum sulfate $(Al_2(SO_4)_3.18H_2O)$. Any commercially-available form of alum, of technical grade or better, such as "Aluminum sulfate hydrate—Technical grade," by Allied Chemical Co., can used in this procedure. The amount of alum used is that which is sufficient to flocculate the mixture and is typically from about 2 to about 40 wt.% of the alkali metal silicate added. After the alum solution, such as a 30 wt.% solution, is added, agitation is continued to assure good mixing. The total mixture is then filtered, such as by a vacuum-drum filter. The filter cake is then dried, as in a typical procedure, and the dried filter cake is than calcined.

To show the differences in operation and behavior between (a) a mixture of white and yellow slurries, with no other additives, and (b) a mixture of white and yellow slurries, followed by the addition of sodium silicate solution, the following examples are given.

EXAMPLE 1

A slurry of 12,150 lbs. of Mapico Light Yellow iron oxide monohyrate (Cities Service Co.), in enough water to result in about 15,000 gallons, was prepared at room temperature. Separately, a slurry of 5900 lbs. ZnO (Ozide 20, from Sherwin-Williams) and enough water to give a total of about 5000 gallons, was prepared at room temperature. The ZnO slurry was added, with constant agitation, to the yellow oxide of iron slurry, and the mixture of about 20,000 gallons was stirred for an additional 3–6 hours. The contents of the mixing vessel were filtered by a vacuum drum filter, the wet cake was transferred to a belt drier, and the cake was dried to less than 1 percent moisture (to reduce the drying load on the calciner). This dried cake was then fed to a screw conveyor calciner, where it was calcined at a temperature of about 925°–980° C. (1700°–1800° F.) for an average residence time of about 20 minutes.

It was noted that, during the calcination step, several problems occurred. There was a build-up of material between the conveyor trough and the screw flights, leading to distortion of the flights and jamming of the conveyor, the jamming occurring about every 15–30 minutes. Also, there was some caking of the material in the conveyor system, with the breaking off of large, hard lumps of calcined material. So, not only was the conveying system out of operation, but subsequent milling of the calcined material was made more difficult and less efficient due to the hard lumps. The ultimate milled product also had a non-uniform color, due to uneven heating of the material during calcination.

EXAMPLE 2

A slurry of 12,150 lbs. of Mapico Light Yellow iron oxide monohydrate, in enough water to result in about 15,000 gallons, was prepared at room temperature. Separately, a slurry of 5900 lbs. ZnO (Ozide 20, from Sherwin-Williams) and enough water to give a total of about 5000 gallons was prepared at room temperature. The ZnO slurry was added, with constant agitation, to the yellow oxide of iron slurry, and the mixture, of about 20,000 gallons was stirred for an additional 3–6 hours. Then, a solution of 24 gallons of sodium silicate (Sodium Silicate-N grade, Philadelphia Quartz Co.) containing the equivalent of 28 wt.% $SiO_2$ was added, with agitation, to the mixture of slurries. After one hour of agitation, the contents of the mixing vessel were filtered by a vacuum drum filter, the wet cake was transferred to a belt drier, and the cake was dried to less than 1 percent moisture. This dried cake was then fed to a screw conveyor calciner, where it was calcined at a temperature of about 925°–980° C. (1700°–1800° F.) for an average residence time of about 20 minutes. During calcining, the torque power remained fairly constant, and minimum caking was observed, with no large lumps formed. Using the "treated" ferrite as feed, the calciner ran continuously for about 3 months, with interruptions only for non-jamming reasons. It was also noted that the product color was more uniform than in Ex. 1. This improvement is believed due to better temperature control during calcining, due to the lack of interruptions from jamming.

While the present invention has been described herein with references to particular embodiments thereof, it will be appreciated by those skilled in the art that various changes and modifications can be made without departing from the scope of the invention.

I claim:

1. A method for improving the calcination of ferrite tans comprising, in serial steps,
   (a) mixing equivalent amounts of an aqueous slurry of yellow iron oxide monohydrate and an aqueous slurry of metal oxide selected from the group consisting of zinc oxide and magnesium oxide, with the concentration of the oxide in each slurry varying from about 10 to about 25 wt.%,
   (b) adding, to the above mixture of slurries, an aqueous solution of an alkali metal silicate selected from the group consisting of sodium silicate and potassium silicate, the amount of added silicate being sufficient to form from about 0.2 wt.% to about 1.0 wt.% $SiO_2$, based on the dry weight of the final ferrite product,
   (c) mixing the materials of step (b),
   (d) filtering and drying the mixture of step (c), and
   (e) calcining the mixture of step (d).

2. The method of claim 1, wherein the filtered and dried mixture of step (d) is calcined at a temperature of 925°–980° C. (1700°–1800° F.) for about 20 minutes, and wherein calciner stoppages, due to jamming of the screw conveyors in the calciner, are minimized, due to the addition of the metal silicate.

3. The method of claim 1, wherein the amount of silicate added is sufficient to form from about 0.4 to about 0.6 wt.% $SiO_2$.

4. The method of claim 1, wherein an aqueous slurry of fumed silica or precipitated silica is substituted for the solution of alkali metal silicate.

5. The method of claim 4, wherein the amount of silica added is from about 0.2 wt.% to about 1.0 wt.%, based on the dry weight of the final ferrite product.

6. The method of claim 1, wherein alum is added, between steps (c) and (d), the amount of alum being from about 2 to about 40 wt.% of the alkali metal silicate used.

* * * * *